(12) United States Patent
Yeh

(10) Patent No.: US 8,516,184 B2
(45) Date of Patent: Aug. 20, 2013

(54) DATA UPDATING USING MARK COUNT THRESHOLD IN NON-VOLATILE MEMORY

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 242 days.

(21) Appl. No.: 13/183,470

(22) Filed: Jul. 15, 2011

(65) Prior Publication Data

US 2012/0278535 A1 Nov. 1, 2012

(30) Foreign Application Priority Data

Apr. 28, 2011 (TW) .............................. 100114930 A

(51) Int. Cl.
*G06F 12/06* (2006.01)
(52) U.S. Cl.
USPC .................... 711/103; 711/202; 711/E12.008
(58) Field of Classification Search
USPC ................................... 711/103, 202, E12.008
See application file for complete search history.

(56) References Cited

U.S. PATENT DOCUMENTS

2004/0210708 A1* 10/2004 Conley ........................... 711/103
2011/0179217 A1* 7/2011 Hsiao ............................. 711/103

* cited by examiner

*Primary Examiner* — Hal Schnee
(74) *Attorney, Agent, or Firm* — Jianq Chyun IP Office

(57) ABSTRACT

A data writing method for writing data belonging to a logical page into a rewritable non-volatile memory module is provided. In the data writing method, a mark count value is set for each logical page. Whether the mark count value corresponding to the logical page is greater than a predetermined threshold is determined. If the mark count value corresponding to the logical page is not greater than the predetermined threshold, the mark count value corresponding to the logical page is counted, and the data and the mark count value corresponding to the logical page are written into a first storage area or a second storage area. Otherwise, the data and the mark count value corresponding to the logical page are written into the second storage area. Thereby, data stored in the rewritable non-volatile memory module can be effectively identified and data loss caused by power failure can be avoided.

16 Claims, 13 Drawing Sheets

DATA UPDATING USING MARK COUNT THRESHOLD IN NON-VOLATILE MEMORY

CROSS-REFERENCE TO RELATED APPLICATION

This application claims the priority benefit of Taiwan application serial no. 100114930, filed on Apr. 28, 2011. The entirety of the above-mentioned patent application is hereby incorporated by reference herein and made a part of this specification.

BACKGROUND

1. Technology Field

The disclosure generally relates to a data writing method and a memory controller and a memory storage apparatus using the same, and more particularly, to a data writing method for writing data into a rewritable non-volatile memory module and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and fast access speed. A solid state drive (SSD) is a storage apparatus which uses a flash memory as its storage medium. Thereby, the flash memory industry has become a very important part of the electronic industry in recent years.

Each sub memory module of a flash memory module has a plurality of physical blocks, and each of the physical blocks has a plurality of physical pages. While writing data into a physical block, the data has to be written according to the sequence of the physical pages in the physical block. In addition, a physical page already containing data has to be erased before it is used for writing new data. In particular, physical block is the smallest erasing unit, and physical page is the smallest programming (writing) unit. Thus, in the management of a flash memory module, the physical blocks thereof are categorized into a data area and a spare area.

Physical blocks (also referred to as data physical blocks) in the data area already contain data and are already mapped to logical blocks. To be specific, the memory management circuit of a memory storage apparatus converts a logical access address accessed by a host system into a logical page of a logical block, writes the data to be written into a physical page of a specific physical block, and maps the logical page of the logical block to the physical page of the physical block. Namely, in the management of a rewritable non-volatile memory module, the physical blocks in the data area are considered used physical blocks (for example, containing data written by a host system). The memory management circuit may record the mapping relationship between the logical blocks and the physical blocks of the data area in a logical block-physical block mapping table, wherein the logical pages of each of logical blocks are sequentially mapped to the physical pages of the corresponding physical block.

Physical blocks of the spare area are used for substituting the physical blocks of the data area. To be specific, as described above, a physical block already storing data has to be erased before it is used for writing new data. Thus, the physical blocks of the spare area are used for writing updated data to substitute the original physical blocks mapped to the logical blocks. Accordingly, the physical blocks of the spare area are either blank physical blocks or usable physical blocks (i.e., no data is recorded therein or data recorded therein is marked as invalid data).

Namely, in the management of a rewritable non-volatile memory module, the physical pages of the physical blocks in the data area and the spare area are alternatively mapped to the logical pages of the logical blocks for storing data written by a host system. Or, in some cases, the memory management circuit selects a plurality of physical blocks from the spare area for respectively storing data having different attributes but belonging to the same logical block. For example, the memory management circuit selects a physical block from the spare area as a global random physical block for storing updated data of small quantities and selects a physical block from the spare area as a log physical block (also referred to as a child physical block) of a specific data physical block for storing continuous updated data of large quantities. In particular, data in a logical page may be repeatedly updated and the updated data may be distributed into different physical blocks. Thus, both old and new data belonging to the same logical page may be stored in a rewritable non-volatile memory module. Conventionally, in order to identify such old and new data, the memory management circuit needs to update the logical page-physical page mapping table every time when a write command is executed.

During the operation of a memory storage apparatus, the mapping tables maintained by the memory management circuit are stored in a buffer memory so that they can be conveniently updated. Since the buffer memory is a volatile memory, in order to avoid data loss, the memory management circuit may store the mapping tables into the rewritable non-volatile memory module at predetermined intervals, or the memory management circuit may also store the mapping tables into the rewritable non-volatile memory module when the memory storage apparatus receives a shutdown command. However, a mapping table in the buffer memory which is not yet stored into the rewritable non-volatile memory module may be lost when a power failure occurs to the memory storage apparatus. Namely, when a power failure occurs, the memory management circuit cannot store the mapping tables in the buffer memory into the rewritable non-volatile memory module in time, and accordingly, when the memory storage apparatus is re-started, the memory management circuit cannot identify which data in the global random physical block and the child physical block is new or old data. Thereby, how to effectively identify the latest data after a power failure has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present disclosure is directed to a data writing method which can correctly identify data stored in a memory storage apparatus after a power failure occurs to the memory storage apparatus, such that data loss is avoided.

Additionally, the present disclosure is also directed to a memory controller which can correctly identify data stored in a memory storage apparatus after a power failure occurs to the memory storage apparatus, such that data loss is avoided.

Furthermore, present disclosure is also directed to a memory storage apparatus which can prevent data loss when a power failure occurs.

According to an exemplary embodiment of the invention, a data writing method for writing updated data into a rewritable non-volatile memory module is provided. The rewritable non-volatile memory module has a plurality of physical blocks, and each of the physical blocks has a plurality of physical pages. The physical blocks are logically grouped into at least a data area and a spare area. A plurality of logical blocks is configured and mapped to the physical blocks in the data area, and each of the logical blocks has a plurality of logical pages. The updated data to be written belongs to a first logical page of a first logical block among the logical blocks, and the first logical block is mapped to a first physical block among the physical blocks of the data area. The data writing method includes setting a plurality of mark count values for the logical pages, wherein each of the logical pages is corresponding to one of the mark count values. The data writing method also includes selecting at least one of the physical blocks in the spare area as a first storage area, selecting at least another one of the physical blocks in the spare area as a second storage area, and determining whether the mark count value corresponding to the first logical page is greater than a predetermined threshold. The data writing method further includes increasing the mark count value corresponding to the first logical page and writing the updated data and the mark count value corresponding to the first logical page into the first storage area or the second storage area when the mark count value corresponding to the first logical page is not greater than the predetermined threshold. The data writing method still includes writing the updated data and the mark count value corresponding to the first logical page into the second storage area when the mark count value corresponding to the first logical page is greater than the predetermined threshold.

According to an exemplary embodiment of the invention, a data writing method for writing updated data into a rewritable non-volatile memory module is provided. The rewritable non-volatile memory module has a plurality of physical blocks, and each of the physical blocks has a plurality of physical pages. The physical blocks are logically grouped into at least a data area and a spare area. A plurality of logical blocks is configured and mapped to the physical blocks in the data area, and each of the logical blocks has a plurality of logical pages. The updated data belongs to a first logical page of a first logical block among the logical blocks, and the first logical block is mapped to a first physical block among the physical blocks in the data area. The data writing method includes setting a plurality of mark count values for the logical pages, wherein each of the logical pages is corresponding to one of the mark count values. The data writing method also includes selecting one of the physical blocks in the spare area as a global random physical block, selecting another one of the physical blocks in the spare area as a child physical block corresponding to the first physical block, and determining whether the mark count value corresponding to the first logical page is greater than a predetermined threshold. The data writing method further includes increasing the mark count value corresponding to the first logical page and writing the updated data and the mark count value corresponding to the first logical page into the global random physical block or the child physical block corresponding to the first physical block when the mark count value corresponding to the first logical page is not greater than the predetermined threshold. The data writing method still includes writing the updated data and the mark count value corresponding to the first logical page into the global random physical block when the mark count value corresponding to the first logical page is greater than the predetermined threshold.

According to an exemplary embodiment of the invention, a data writing method for writing updated data into a rewritable non-volatile memory module is provided. The rewritable non-volatile memory module has a plurality of physical blocks, and each of the physical blocks has a plurality of physical pages. The physical blocks are logically grouped into at least a data area and a spare area. A plurality of logical blocks is configured and mapped to the physical blocks in the data area, and each of the logical blocks has a plurality of logical pages. The updated data belongs to a first logical page of a first logical block among the logical blocks, and the first logical block is mapped to a first physical block among the physical blocks in the data area. The data writing method includes setting a plurality of mark count values for the logical pages, wherein each of the logical pages is corresponding to one of the mark count values. The data writing method also includes selecting one of the physical blocks in the spare area as a global random physical block, selecting another one of the physical blocks in the spare area as a child physical block corresponding to the first physical block, and determining whether the mark count value corresponding to the first logical page is greater than a predetermined threshold. The data writing method further includes increasing the mark count value corresponding to the first logical page and writing the updated data and the mark count value corresponding to the first logical page into the global random physical block or the child physical block corresponding to the first physical block when the mark count value corresponding to the first logical page is not greater than the predetermined threshold. The data writing method still includes writing the updated data and the mark count value corresponding to the first logical page into the global random physical block when the mark count value corresponding to the first logical page is greater than the predetermined threshold.

According to an exemplary embodiment of the invention, a memory controller for controlling a rewritable non-volatile memory module is provided. The rewritable non-volatile memory module has a plurality of physical blocks, wherein each of the physical blocks has a plurality of physical pages which are sequentially arranged. The memory controller includes a host interface, a memory interface, and a memory management circuit. The host interface is configured to couple to a host system. The memory interface is configured to couple to the rewritable non-volatile memory module. The memory management circuit is coupled to the memory interface. The memory management circuit logically groups the physical blocks into at least a data area and a spare area. The memory management circuit configures a plurality of logical blocks to be mapped to the physical blocks in the data area, wherein each of the logical blocks has a plurality of logical pages. The memory management circuit sets a plurality of mark count values for the logical pages, wherein each of the logical pages is corresponding to one of the mark count values. The memory management circuit selects one of the physical blocks in the spare area as a global random physical block and receives updated data from the host system, wherein the updated data belongs to a first logical page of a first logical block among the logical blocks, and the first logical block is mapped to a first physical block among the physical blocks in the data area. The memory management circuit selects another one of the physical blocks in the spare area as a child physical block corresponding to the first physical block. The memory management circuit determines whether the mark count value corresponding to the first logical page is greater than a predetermined threshold. When the mark count value corresponding to the first logical page is not greater than the predetermined threshold, the memory management circuit counts the mark count value corresponding to the first logical page and writes the updated data and the mark count value corresponding to the first logical page into the global random physical block or the child physical block corresponding to the first physical block. When the mark count value corresponding to the first logical page is greater than the predetermined threshold, the memory management circuit writes the updated data and the mark count value corresponding to the first logical page into the child physical block corresponding to the first physical block.

According to an exemplary embodiment of the invention, a memory controller for controlling a rewritable non-volatile memory module is provided. The rewritable non-volatile memory module has a plurality of physical blocks, wherein each of the physical blocks has a plurality of physical pages which are sequentially arranged. The memory controller includes a host interface, a memory interface, and a memory management circuit. The host interface is configured to couple to a host system. The memory interface is configured to couple to the rewritable non-volatile memory module. The memory management circuit is coupled to the memory interface. The memory management circuit logically groups the physical blocks into at least a data area and a spare area. The memory management circuit configures a plurality of logical blocks to be mapped to the physical blocks in the data area, wherein each of the logical blocks has a plurality of logical pages. The memory management circuit sets a plurality of mark count values for the logical pages, wherein each of the logical pages is corresponding to one of the mark count values. The memory management circuit selects one of the physical blocks in the spare area as a global random physical block and receives updated data from the host system, wherein the updated data belongs to a first logical page of a first logical block among the logical blocks, and the first logical block is mapped to a first physical block among the physical blocks in the data area. The memory management circuit selects another one of the physical blocks in the spare area as a child physical block corresponding to the first physical block. The memory management circuit determines whether the mark count value corresponding to the first logical page is greater than a predetermined threshold. When the mark count value corresponding to the first logical page is not greater than the predetermined threshold, the memory management circuit counts the mark count value corresponding to the first logical page writes the updated data and the mark count value corresponding to the first logical page into the global random physical block or the child physical block corresponding to the first physical block. When the mark count value corresponding to the first logical page is greater than the predetermined threshold, the memory management circuit writes the updated data and the mark count value corresponding to the first logical page into the global random physical block.

According to an exemplary embodiment of the invention, a memory storage apparatus including a connector, a rewritable non-volatile memory module, and a memory controller is provided. The connector is configured to couple to a host system. The rewritable non-volatile memory module has a plurality of physical blocks, wherein each of the physical blocks has a plurality of physical pages which are sequentially arranged. The memory controller is coupled to the connector and the rewritable non-volatile memory module. The memory controller logically groups the physical blocks into at least a data area and a spare area. The memory controller configures a plurality of logical blocks to be mapped to the physical blocks in the data area, wherein each of the logical blocks has a plurality of logical pages. The memory controller sets a plurality of mark count values for the logical pages, wherein each of the logical pages is corresponding to one of the mark count values. The memory controller selects at least one of the physical blocks in the spare area as a global random physical block. The memory controller receives updated data from the host system, wherein the updated data belongs to a first logical page of a first logical block among the logical blocks, and the first logical block is mapped to a first physical block among the physical blocks in the data area. The memory controller selects at least another one of the physical blocks in the spare area as a child physical block corresponding to the first physical block. The memory controller determines whether the mark count value corresponding to the first logical page is greater than a predetermined threshold. When the mark count value corresponding to the first logical page is not greater than the predetermined threshold, the memory controller counts the mark count value corresponding to the first logical page and writes the updated data and the mark count value corresponding to the first logical page into the global random physical block or the child physical block corresponding to the first physical block. When the mark count value corresponding to the first logical page is greater than the predetermined threshold, the memory controller writes the updated data and the mark count value corresponding to the first logical page into the child physical block corresponding to the first physical block.

According to an exemplary embodiment of the invention, a memory storage apparatus including a connector, a rewritable non-volatile memory module, and a memory controller is provided. The connector is configured to couple to a host system. The rewritable non-volatile memory module has a plurality of physical blocks, wherein each of the physical blocks has a plurality of physical pages which are sequentially arranged. The memory controller is coupled to the connector and the rewritable non-volatile memory module. The memory controller logically groups the physical blocks into at least a data area and a spare area. The memory controller configures a plurality of logical blocks to be mapped to the physical blocks in the data area, wherein each of the logical blocks has a plurality of logical pages. The memory controller sets a plurality of mark count values for the logical pages, wherein each of the logical pages is corresponding to one of the mark count values. The memory controller selects at least one of the physical blocks in the spare area as a global random physical block. The memory controller receives updated data from the host system, wherein the updated data belongs to a first logical page of a first logical block among the logical blocks, and the first logical block is mapped to a first physical block among the physical blocks in the data area. The memory controller selects at least another one of the physical blocks in the spare area as a child physical block corresponding to the first physical block. The memory controller determines whether the mark count value corresponding to the first logical page is greater than a predetermined threshold. When the mark count value corresponding to the first logical page is not greater than the predetermined threshold, the memory controller counts the mark count value corresponding to the first logical page and writes the updated data and the mark count value corresponding to the first logical page into the global random physical block or the child physical block corresponding to the first physical block. When the mark count value corresponding to the first logical page is greater than the predetermined threshold, the memory controller writes the updated data and the mark count value corresponding to the first logical page into the global random physical block.

As described above, the invention provides a data writing method, a memory controller, and a memory storage apparatus, wherein the latest data stored in the memory storage apparatus can be effectively identified after a power failure, so that data loss is avoided.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
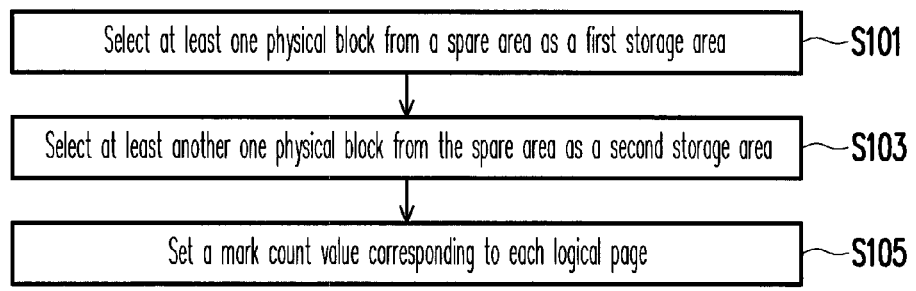
FIG. 1A and FIG. 1B are schematic flowcharts of a data writing method according to the disclosure.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1B:
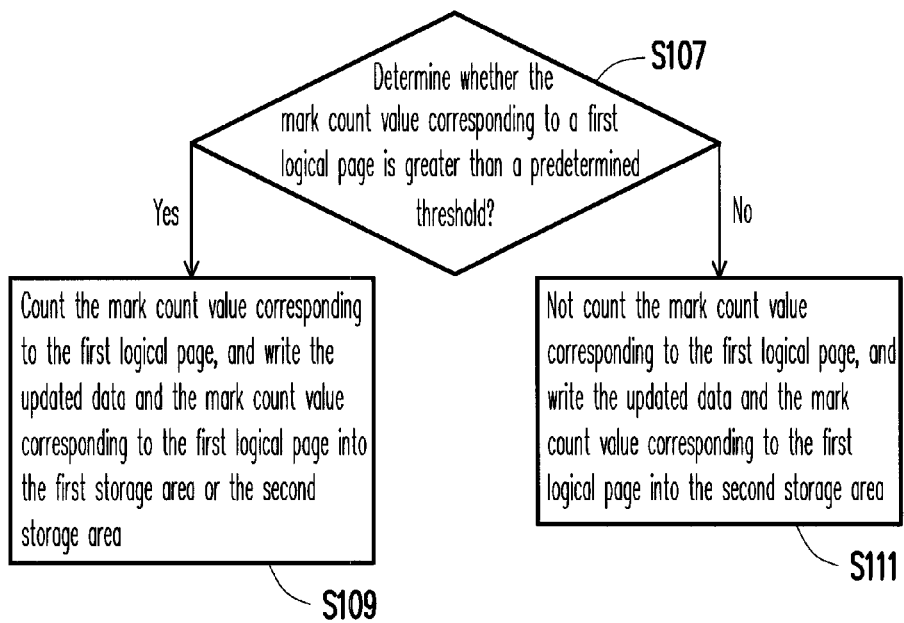

FIG. 1A and FIG. 1B are schematic flowcharts of a data writing method according to the disclosure.

Referring to FIG. 1A and FIG. 1B, in the data writing method provided by the disclosure, at least one physical block in the spare area is selected and served as a first storage area (S101), and at least another one of the physical blocks in the spare area is selected and served as a second storage area (S103). Herein the first storage area and the second storage area are used for writing data from a host system. The first storage area (or the second storage area) may be a global random physical block or a child physical block. In addition, a mark count value corresponding to each logical page is set (S105), wherein the mark count value is an accumulated value and used for identifying the latest data. Moreover, when updated data is to be written into a specific logical page (referred to as a first logical page thereinafter), whether the mark count value corresponding to the first logical page is greater than a predetermined threshold is determined (S107). If the mark count value corresponding to the first logical page is not greater than the predetermined threshold, the mark count value corresponding to the first logical page is counted, and the updated data and the mark count value corresponding to the first logical page are written into the first storage area or the second storage area (S109). If the mark count value corresponding to the first logical page is greater than the predetermined threshold, the mark count value corresponding to the first logical page is not counted, and the updated data and the mark count value corresponding to the first logical page are written into the second storage area (S111). Namely, when the mark count value corresponding to a specific logical page is greater than the predetermined threshold, updated data to be written into the logical page is only written into sequentially arranged physical pages of a specific storage area. Accordingly, the latest data corresponding to the logical page can be correctly identified. Below, an exemplary embodiment of the invention will be described in detail.

Generally speaking, a memory storage apparatus (also referred to as a memory storage system) includes a rewritable non-volatile memory module and a controller (also referred to as a control circuit). The memory storage apparatus is usually used along with a host system so that the host system can write data into or read data from the memory storage apparatus.

Figure 2A:
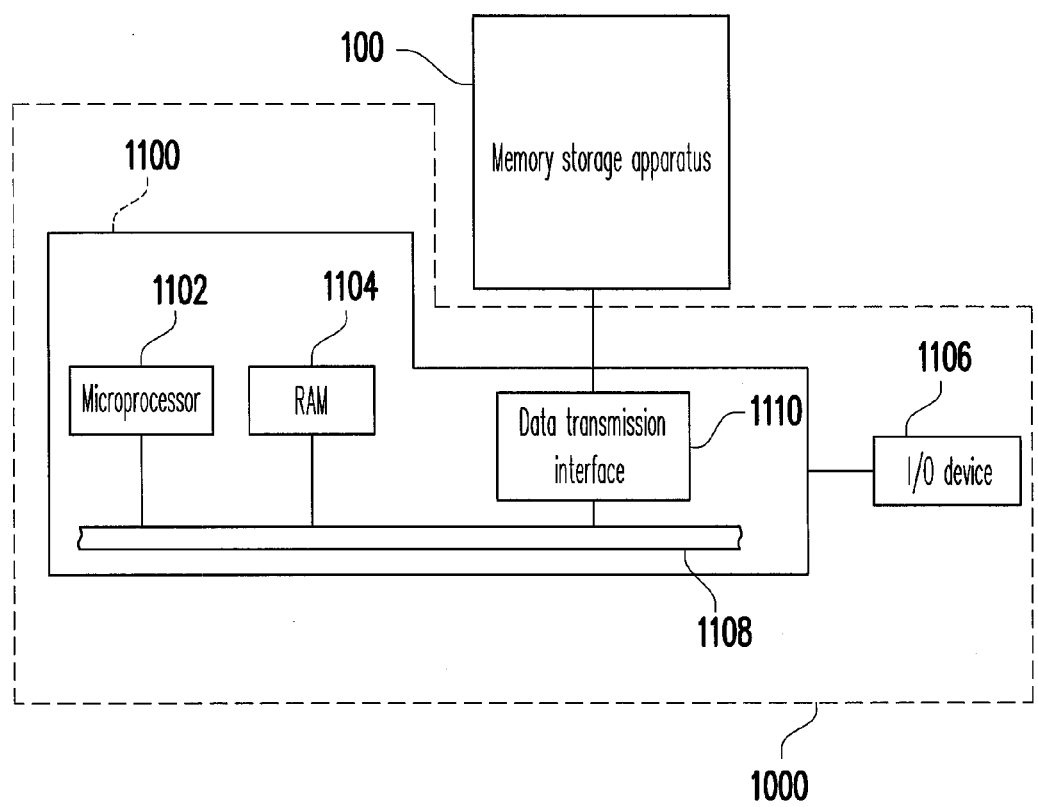
FIG. 2A illustrates a host system and a memory storage apparatus according to an exemplary embodiment of the disclosure.

FIG. 2A illustrates a host system and a memory storage apparatus according to an exemplary embodiment of the disclosure.

Figure 2B:
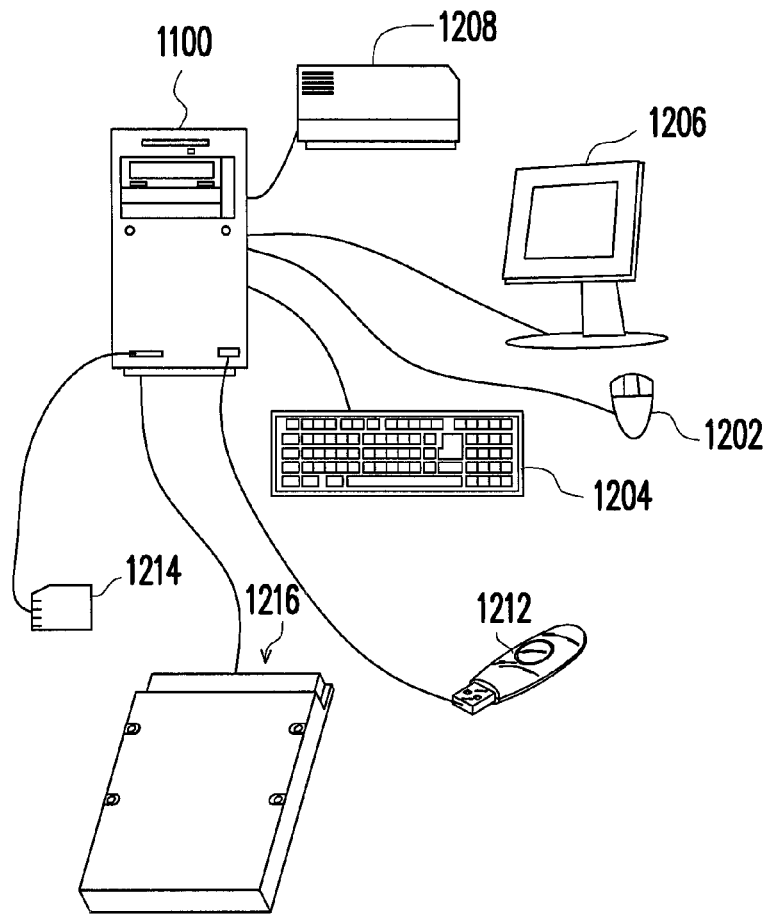
FIG. 2B is a diagram of a computer, an input/output (I/O) device, and a memory storage apparatus according to an exemplary embodiment of the disclosure.

Referring to FIG. 2A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2B. It should be understood that the I/O device 1106 is not limited to the devices illustrated in FIG. 2B and may further include other devices.

In the present embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a rewritable non-volatile memory storage apparatus, such as the flash drive 1212, the memory card 1214, or the solid state drive (SSD) 1216 illustrated in FIG. 2B.

Figure 2C:
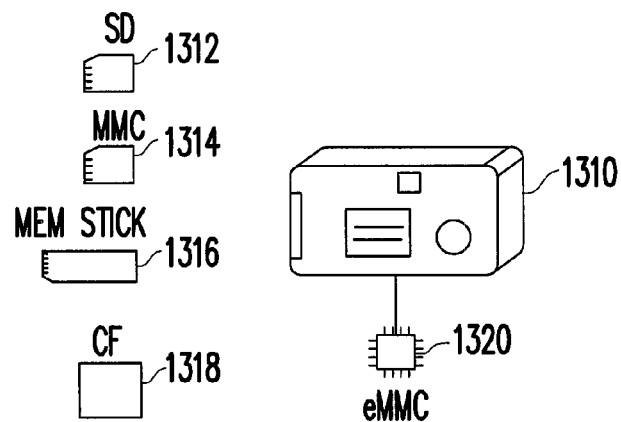
FIG. 2C is a diagram of a host system and a memory storage apparatus according to another exemplary embodiment of the disclosure.

In general, the host system 1000 may be substantially any system that can work with the memory storage apparatus 100 to store data. Even tough the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 2C) used by the digital camera (video camera) 1310. The embedded storage device 1320 includes an embedded MMC (eMMC). It should be mentioned that the eMMC is directly coupled to the motherboard of the host system.

Figure 3:
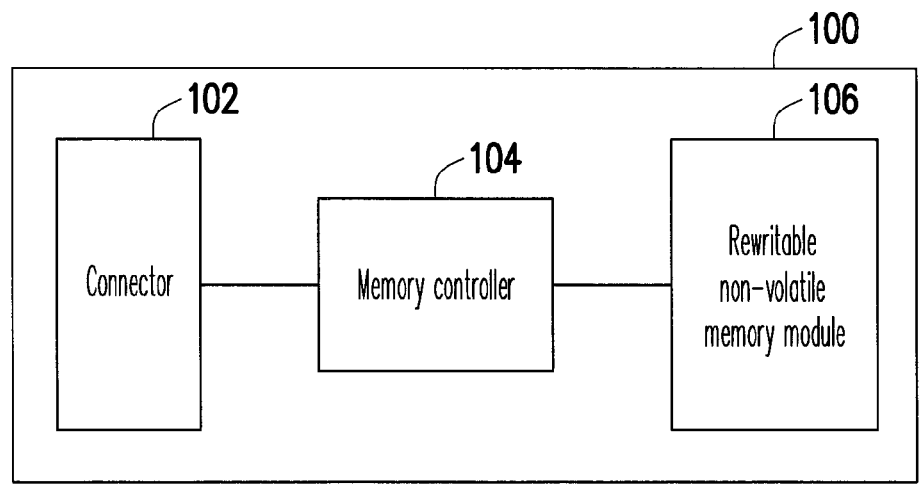
FIG. 3 is a schematic block diagram of the memory storage apparatus in FIG. 2A.

FIG. 3 is a schematic block diagram of the memory storage apparatus in FIG. 2A.

Referring to FIG. 3, the memory storage apparatus 100 includes a connector 102, a memory controller 104, and a rewritable non-volatile memory module 106.

In the present exemplary embodiment, the connector 102 is compatible to the serial advanced technology attachment (SATA) standard. However, the invention is not limited thereto, and the connector 102 may also be compatible to the Institute of Electrical and Electronic Engineers (IEEE) 1394 standard, the peripheral component interconnect (PCI) express standard, the universal serial bus (USB) standard, the SD interface standard, the MS interface standard, the MMC interface standard, the CF interface standard, the integrated device electronics (IDE) standard, or any other suitable standard.

The memory controller 104 executes a plurality of logic gates or control instructions implemented in a hardware form or a firmware form and performs various data operations on the rewritable non-volatile memory module 106 according to commands received from the host system 1000.

The rewritable non-volatile memory module 106 is coupled to the memory controller 104 and has a plurality of physical blocks for storing data written by the host system 1000. In the present exemplary embodiment, each physical block has a plurality of physical pages, wherein the physical pages belonging to the same physical block can be individually written but have to be erased all together. Each physical block may be composed of 128 physical pages, and each physical page may have a capacity of 4 kilobytes (KB). However, the invention is not limited thereto, and each physical block may also be composed of 64, 256, or any other number of physical pages.

To be specific, physical block is the smallest erasing unit. Namely, each physical block contains the least number of memory cells that are erased together. Physical page is the smallest programming unit. Namely, physical page is the smallest unit for writing data. However, in another exemplary embodiment of the invention, the smallest unit for writing data may also be physical sector or other units. Each physical page usually includes a data bit area and a redundancy bit area, wherein the data bit area is used for storing user data, and the redundancy bit area is used for storing system data (for example, error checking and correcting (ECC) codes).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, any other flash memory module, or any memory module having the same characteristics.

Figure 4:
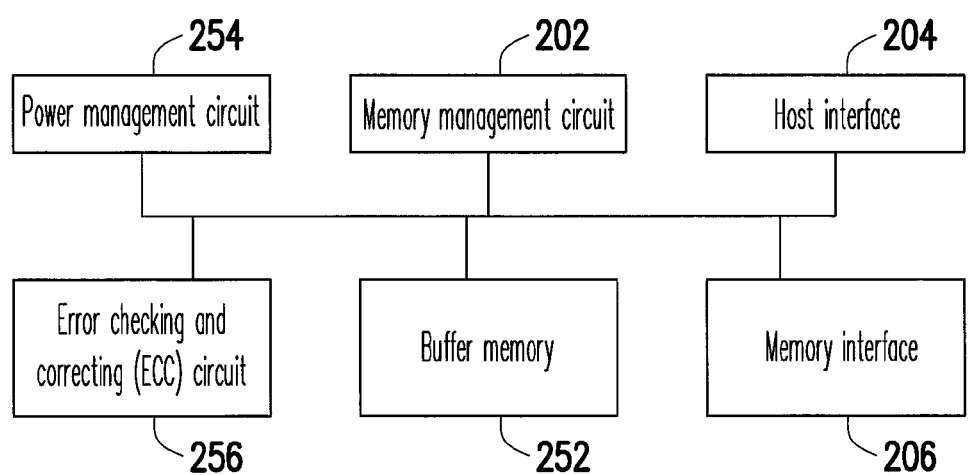
FIG. 4 is a schematic block diagram of a memory controller according to an exemplary embodiment of the disclosure.

FIG. 4 is a schematic block diagram of a memory controller according to an exemplary embodiment of the disclosure.

Referring to FIG. 4, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage apparatus 100 is in operation, the control instructions are executed to process valid data in the rewritable non-volatile memory module 106 according to the data merging method provided by the present exemplary embodiment.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to perform various data operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a driving code, and when the memory controller 104 is enabled, the microprocessor unit first executes the driving code to load the control instructions from the rewritable non-volatile memory module 106 into the RAM of the memory management circuit 202. After that, the microprocessor unit runs these control instructions to carry out various data operations. Additionally, in yet another exemplary embodiment of the present invention, the control instructions of the memory management circuit 202 may also be implemented in a hardware form.

The host interface 204 is coupled to the memory management circuit 202 and configured to receive and identify commands and data sent by the host system 1000. Namely, commands and data sent by the host system 1000 are transmitted to the memory management circuit 202 via the host interface 204. In the present exemplary embodiment, the host interface 204 is compatible to the SATA standard. However, the invention is not limited thereto, and the host interface 204 may also be compatible to the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the disclosure, the memory controller 104 further includes a buffer memory 252. The buffer memory 252 is coupled to the memory management circuit 202 and used for temporarily storing data and commands from the host system 1000 or data from the rewritable non-volatile memory module 106.

In an exemplary embodiment of the invention, the memory controller 104 further includes a power management circuit 254. The power management circuit 254 is coupled to the memory management circuit 202 and configured to control the power supply of the memory storage apparatus 100.

In an exemplary embodiment of the invention, the memory controller 104 further includes an ECC circuit 256. The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code together into the rewritable non-volatile memory module 106. Subsequently, when the memory management circuit 202 reads data from the rewritable non-volatile memory module 106, it also reads the ECC code corresponding to the data, and the ECC circuit 256 executes the ECC procedure on the read data according to the read ECC code.

Figure 5:
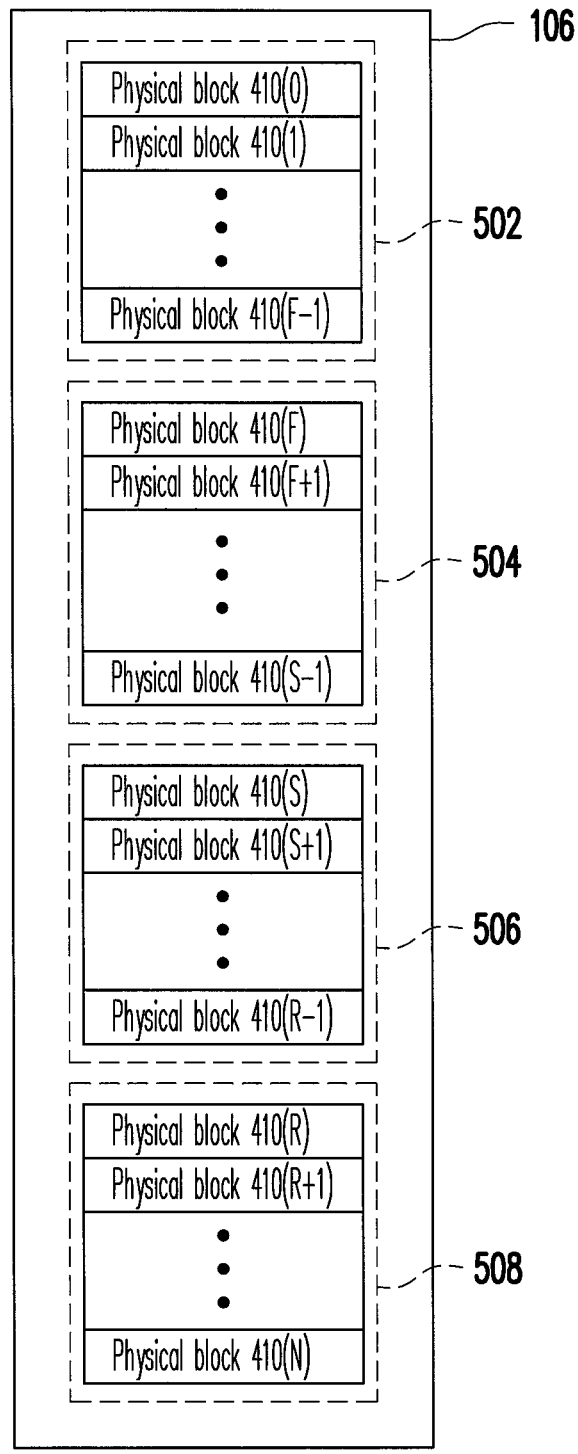
FIG. 5 and FIG. 6 are diagrams of managing physical blocks of a rewritable non-volatile memory module according to an exemplary embodiment of the disclosure.
Figure 6:
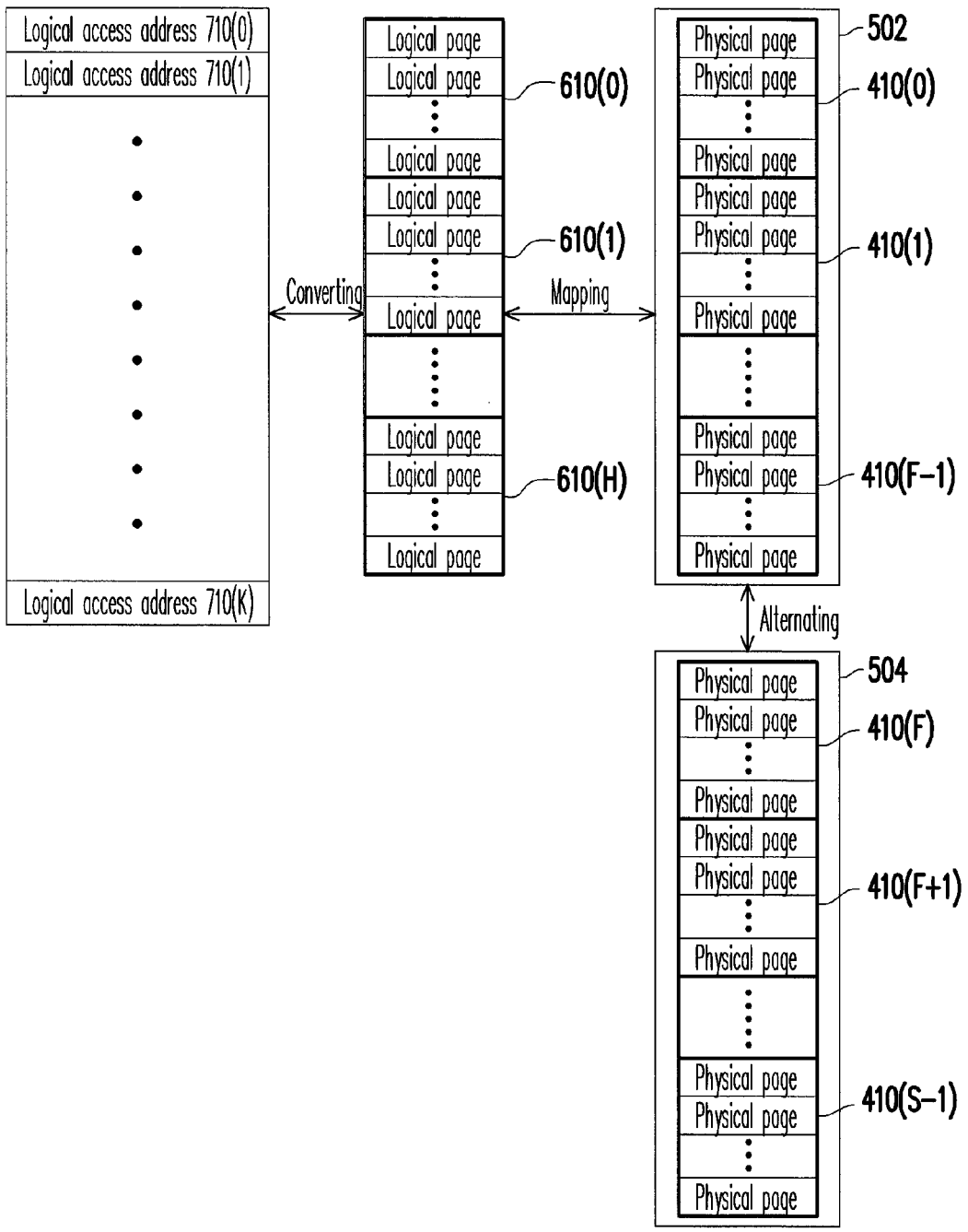

FIG. 5 and FIG. 6 are diagrams of managing physical blocks of a rewritable non-volatile memory module according to an exemplary embodiment of the disclosure.

Referring to FIG. 5, the rewritable non-volatile memory module 106 has physical blocks 410(0)-410(N), and the memory management circuit 202 of the memory controller 104 logically groups the physical blocks 410(0)-410(N) into a data area 502, a spare area 504, a system area 506, and a replacement area 508.

The physical blocks logically belonging to the data area 502 and the spare area 504 are used for storing data from the host system 1000. To be specific, the physical blocks (also referred to as data physical blocks) in the data area 502 are considered physical blocks already containing data, and the physical blocks (also referred to as free physical blocks) in the spare area 504 are used for writing new data. For example, when a write command and data to be written are received from the host system 1000, the memory management circuit 202 selects a physical block from the spare area 504 as a log physical block and writes the data into the log physical block. Or, when a data merging procedure is executed on a specific logical block, the memory management circuit 202 selects a physical block from the spare area 504 as a new data physical block corresponding to the logical block to write data and substitutes the data physical block originally mapped to the logical block.

The physical blocks logically belonging to the system area 506 are used for recording system data, such as the manufacturer and model of the rewritable non-volatile memory module, the number of physical blocks in the rewritable non-volatile memory module, and the number of physical pages in each physical block.

The physical blocks logically belonging to the replacement area 508 are used for replacing damaged physical blocks in a bad block replacement procedure. To be specific, if there are still normal physical blocks in the replacement area 508 and a physical block in the data area 502 is damaged, the memory management circuit 202 selects a normal physical block from the replacement area 508 to replace the damaged physical block.

As described above, during the operation of the memory storage apparatus 100, the physical blocks grouped into the data area 502, the spare area 504, the system area 506, and the replacement area 508 are dynamically changed. For example, those physical blocks which are alternatively used for storing data are dynamically associated with the data area 502 or the spare area 504.

It should be mentioned that in the present exemplary embodiment, the memory management circuit 202 manages the rewritable non-volatile memory module 106 in unit of physical block. However, the disclosure is not limited thereto, and in another exemplary embodiment, the memory management circuit 202 may also group the physical blocks into a plurality of physical units and manages the rewritable non-volatile memory module 106 in a unit of each physical unit. Each physical unit may be composed of at least one physical block belonging to the same sub memory module or different sub memory modules.

Referring to FIG. 6, the memory management circuit 202 configures logical blocks 610(0)-610(H) to be mapped to the physical blocks in the data area 502. Each logical block has a plurality of logical pages, and these logical pages are sequentially mapped to the physical pages of the corresponding data physical block. For example, when the memory storage apparatus 100 is formatted, the logical blocks 610(0)-610(H) are initially mapped to the physical blocks 410(0)-410(F-1) in the data area 502.

In the present exemplary embodiment, the memory management circuit 202 maintains a logical block-physical block mapping table to record the mapping relationship between the logical blocks 610(0)-610(H) and the physical blocks of the data area 502. In addition, because the host system 1000 accesses data in a unit of each logical access address (for example, sector), when the host system 1000 accesses data, the memory management circuit 202 converts the logical access addresses 710(0)-710(K) corresponding to the memory storage apparatus 100 into corresponding logical pages. For example, when the host system 1000 is about to access a specific logical access address, the memory management circuit 202 converts the logical access address to be accessed by the host system 1000 into a multi-dimensional address composed of the corresponding logical block and logical page and accesses the data in the corresponding physical page based on the logical block-physical block mapping table.

Figure 7:
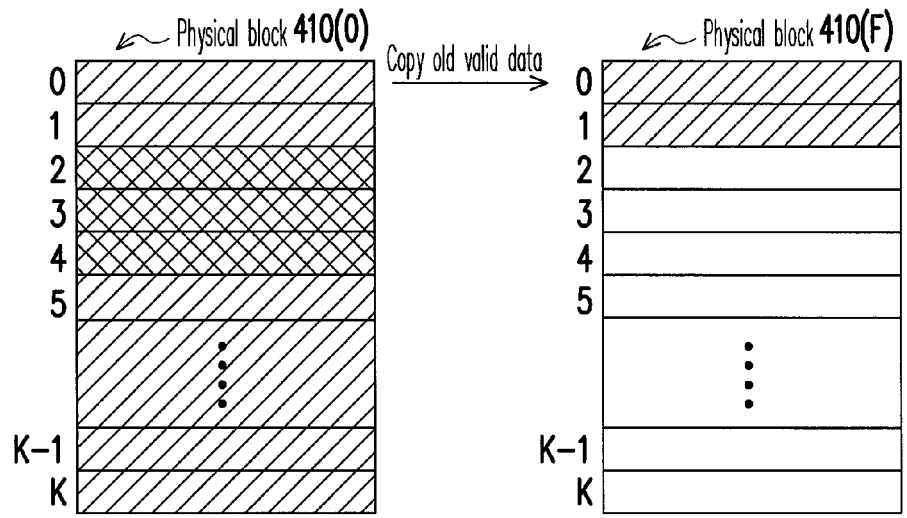
FIGS. 7-9 illustrate an example of writing updated data by using a child physical block according to an exemplary embodiment of the v.
Figure 8:
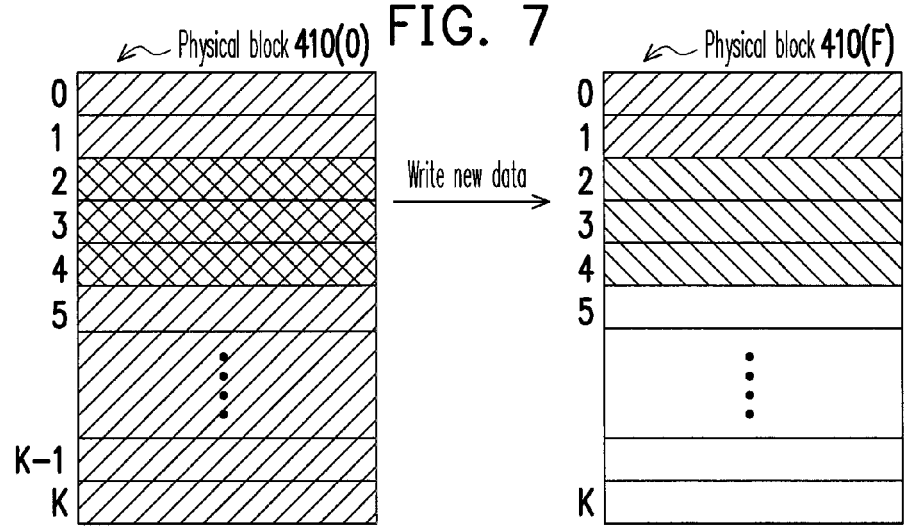
Figure 9:
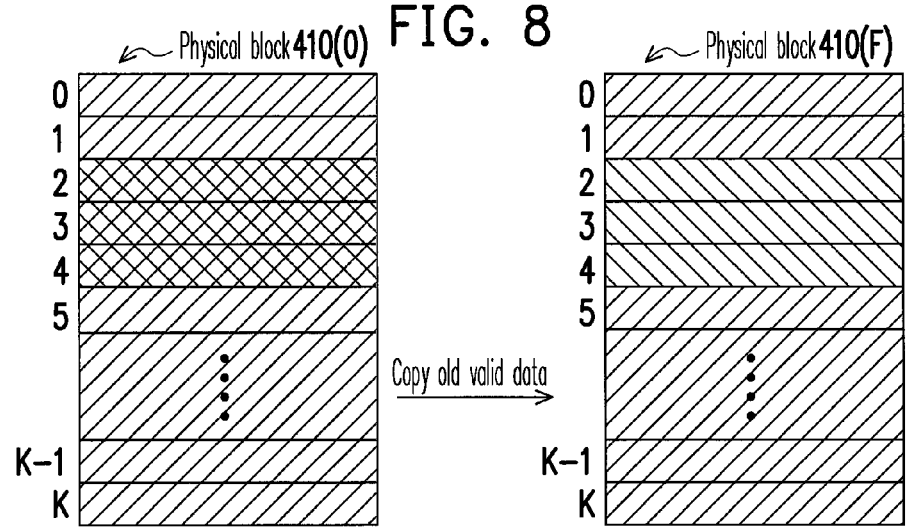

FIGS. 7-9 illustrate an example of writing updated data by using a child physical block according to an exemplary embodiment of the disclosure.

Referring to FIGS. 7-9, it is assumed that the logical block 610(0) is mapped to the physical block 410(0). And, when the memory controller 104 receives a write command from the host system 1000 and accordingly is about to write data into a logical page of the logical block 610(0), the memory management circuit 202 identifies that the logical block 610(0) is currently mapped to the physical block 410(0) according to the logical block-physical block mapping table and selects the physical block 410(F) from the spare area 504 as a child physical block for substituting the physical block 410(0). However, when the memory management circuit 202 writes the new data (i.e., updated data) into the physical block 410 (F), the memory management circuit 202 does not instantly move all the valid data in the physical block 410(0) to the physical block 410(F) to erase the physical block 410(0). To be specific, the memory management circuit 202 copies the valid data before the physical page for writing the data in the physical block 410(0) (i.e., data in the $0^{th}$ and $1^{st}$ physical pages of the physical block 410(0)) to the $0^{th}$ and $1^{st}$ physical pages of the physical block 410(F) (as shown in FIG. 7) and writes the new data into the $2^{nd}$-$4^{th}$ physical pages of the physical block 410(F) (as shown in FIG. 8). Herein the memory management circuit 202 completes the data writing operation. Because the valid data in the physical block 410(0) may become invalid during a next operation (for example, a write command), instantly moving all the valid data in the physical block 410(0) to the physical block 410(F) may become meaningless. In addition, since data has to be sequentially written into the physical pages of a physical block, the memory management circuit 202 only moves the valid data before the physical page for writing the new data (i.e., data stored in the $0^{th}$ and $1^{st}$ physical pages of the physical block 410(0)) and does not move the other valid data (i.e., data stored in the $5^{th}$-$K^{th}$ physical pages of the physical block 410(0)) temporarily.

In the present exemplary embodiment, the operation for maintaining such a temporary relationship is referred to as opening mother-child blocks, wherein the original physical block (for example, the physical block 410(0)) is referred to as a mother physical block while the log physical block (for example, the physical block 410(F)) is referred to as a child physical block. Herein one mother physical block and at least one corresponding child physical block are referred to as a mother-child block set.

Subsequently, when the data in the physical block 410(0) and the physical block 410(F) is to be merged, the memory management circuit 202 combines the data in the physical block 410(0) and the physical block 410(F) into a single physical block, so that the efficiency in using these physical blocks can be improved. Herein the operation for merging the mother-child blocks is referred to as a data merging procedure or closing mother-child blocks. For example, as shown in FIG. 9, while closing the mother-child blocks, the memory management circuit 202 copies the remaining valid data in the physical block 410(0) (i.e., data in the $5^{th}$-$K^{th}$ physical pages of the physical block 410(0)) to the $5^{th}$-$K^{th}$ physical pages of the substitute physical block 410(F). Then, the memory management circuit 202 executes an erasing operation on the physical block 410(0) and associates the erased physical block 410(0) to the spare area 504. Meanwhile, the memory management circuit 202 associates the physical block 410(F) to the data area 502. Namely, the memory management circuit 202 re-maps the logical block 610(0) to the physical block 410(F) in the logical block-physical block mapping table. Additionally, in the present exemplary embodiment, the memory management circuit 202 establishes a spare area physical block table (not shown) to record the physical blocks that are currently associated to the spare area 504. It should be mentioned that there is a limited number of physical blocks in the spare area 504. Accordingly, during the operation of the memory storage apparatus 100, only a limited number of mother-child block sets can be opened. Thus, when the memory storage apparatus 100 receives a write command from the host system 1000, if the number of opened mother-child block sets has reached its upper limit, the memory management circuit 202 needs to close at least one set of mother-child blocks before it executes the write command.

Besides writing updated data by using a log physical block, in the present exemplary embodiment, the memory management circuit 202 may further select at least one physical block from the spare area 504 as a global random physical block and use the global random physical block to write updated data. For example, if the data in a logical page to be updated by the host system 1000 has been written into a log physical block, the updated data will be written into a global random physical block so that the data merging procedure won't be executed repeatedly.

Figure 10:
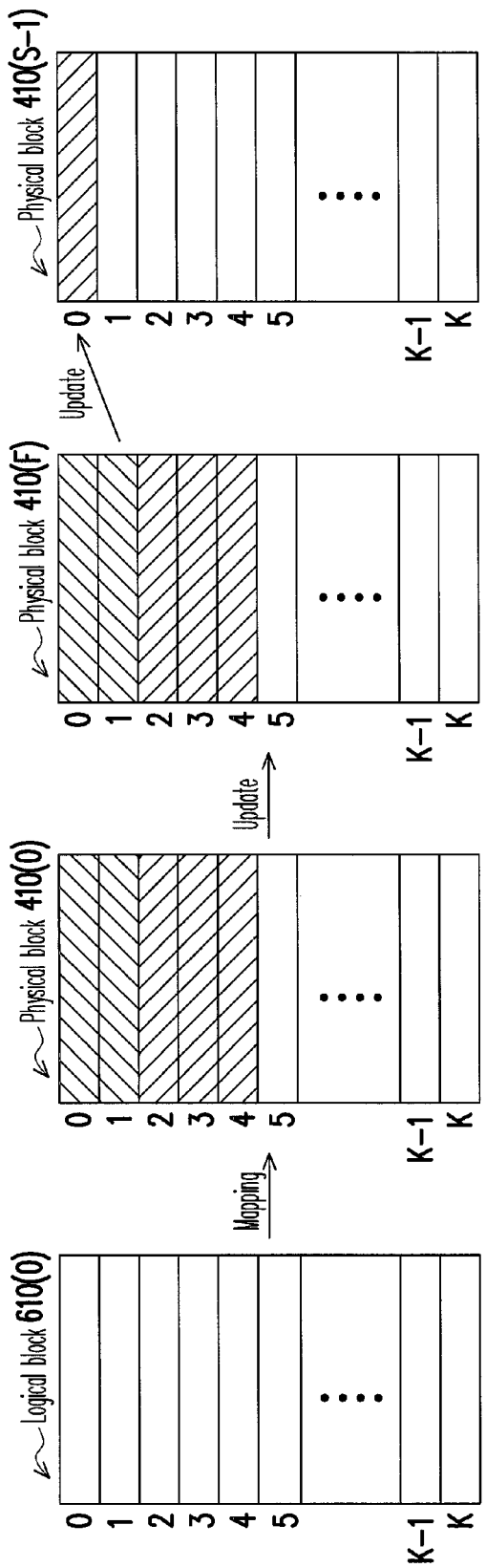
FIG. 10 is a diagram of writing data by using a child physical block and a global random physical block according to an exemplary embodiment of the disclosure.

FIG. 10 is a diagram writing data by using a child physical block and a global random physical block according to an exemplary embodiment of the disclosure.

Referring to FIG. 10, it is assumed that the physical block 410(S-1) is selected as a global random physical block. And, when the host system 1000 is about to write updated data into the $1^{st}$ logical page of the logical block 610(0) in the storage state illustrated in FIG. 8, the memory management circuit 202 writes the updated data into the first blank physical page of the global random physical block (for example, the $0^{th}$ physical page of the physical block 410(S-1)).

In the present exemplary embodiment, when a current global random physical block is full, the memory management circuit 202 selects another physical block from the spare area 504 as a new global random physical block until the number of physical blocks served as global random physical blocks reaches a predetermined value. To be specific, because there is a limited number of physical blocks in the spare area 504, the number of physical blocks that can be served as global random physical blocks is also limited. When the number of physical blocks served as global random physical blocks reaches the predetermined value, the memory management circuit 202 executes aforementioned data merging procedure to erase any global random physical block containing only invalid data and link the erased physical block to the spare area 504. Thereby, the memory management circuit 202 can select a blank physical block from the spare area 504 as a global random physical block when it executes the next write command.

In the storage state illustrated in FIG. 10, the $1^{st}$ physical page of the mother physical block 410(0), the $1^{st}$ physical page of the child physical block 410(F), and the global random physical block 410(S-1) all store data belonging to the $1^{st}$ logical page of the logical block 610(0). In order to identify that the data stored in the global random physical block 410 (S-1) is the latest data, as described above, the memory management circuit 202 maintains a logical page-physical page mapping table to record the updated relationship and periodically stores the logical page-physical page mapping table into the rewritable non-volatile memory module 106. All mapping tables required by the operation of the memory storage apparatus 100 may be stored in the system area 506.

In an exemplary embodiment of the disclosure, the memory management circuit 202 sets a plurality of mark count values for all the logical pages to record the number of times each logical page is updated. To be specific, every time when data (i.e., updated data) is written into a specific logical page, the mark count value corresponding to the logical page is increased by 1. In the present exemplary embodiment, one logical page is corresponding to one mark count value. However, the disclosure is not limited thereto, and in another exemplary embodiment of the disclosure, several logical pages may be corresponding to the same mark count value. In yet another exemplary embodiment of the disclosure, the mark count value may also be increased by other predetermined values.

Figure 11:
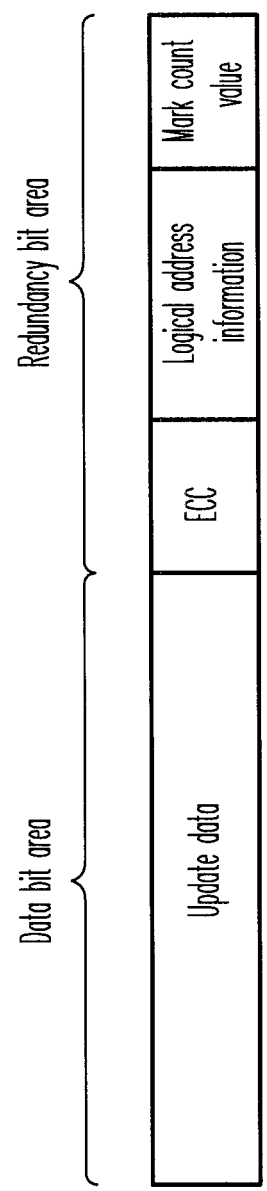
FIG. 11 illustrates the data structure of a physical page according to an exemplary embodiment of the disclosure.

Particularly, while writing data into a physical page, the memory management circuit 202 writes both the logical address information (for example, a serial number) of the logical page corresponding to the data and the mark count value corresponding to the logical page into the redundancy bit area of the physical page (as shown in FIG. 11). Accordingly, when the mapping table temporarily stored in the buffer memory 252 is lost due to power failure of the memory storage apparatus 100, the memory management circuit 202 can identify the physical page corresponding to each logical page according to information (i.e., the logical address information) in the redundancy bit area of each physical page. In particular, the memory management circuit 202 can identify the latest data according to the mark count value.

It should be mentioned that because the redundancy bit area has a limited storage space, the mark count value recorded therein is within a limited range. In the present exemplary embodiment, when a mark count value is greater than a predetermined threshold, the memory management circuit 202 stops increasing the mark count value. For example, when a mark count value has a range of 0-255, the predetermined threshold is set to 254.

In the present exemplary embodiment, while writing updated data into a physical page, the memory management circuit 202 determines whether the mark count value of the logical page corresponding to the updated data is greater than the predetermined threshold. If the mark count value is not greater than the predetermined threshold, the memory management circuit 202 counts the mark count value and writes the updated data by using a log physical block (as shown in FIG. 7 and FIG. 8) or a global random physical block (as shown in FIG. 10) according to the characteristic of the updated data. However, if the mark count value is greater than the predetermined threshold, the memory management circuit 202 does not count the mark count value and writes the updated data by using only the log physical block. To be specific, because the mark count value cannot be counted anymore, it cannot be used for identifying the latest data. In the present exemplary embodiment, because the physical pages of a physical block have to be sequentially written, the memory management circuit 202 can still identify the latest data according to the sequence of the physical pages when subsequent updated data is written by using only the log physical block.

It has to be understood that in the present exemplary embodiment, when the mark count value is greater than the predetermined threshold, the memory management circuit 202 writes the updated data by using only a log physical block. However, in another exemplary embodiment of the invention, when the mark count value is greater than the predetermined threshold, the memory management circuit 202 may also write the updated data by using only a global random physical block in order to identify the latest data effectively.

As described above, at a proper time, the memory management circuit 202 selects a logical block to execute the data merging procedure, and valid data belonging to the logical pages of the logical block is sequentially copied into a physical block selected from the spare area 504. In particular, while executing the data merging procedure to copy valid data in a logical page, the memory management circuit 202 also determines whether the global random physical block contains any data belonging to the logical page. If the global random physical block does not contain the data belonging to the logical page, the memory management circuit 202 resets the mark count value (for example, to 0) of the logical page.

To be specific, when the data merging procedure is executed on a logical block, all latest data belonging to the logical block is copied into a physical block selected from the spare area 504, and all the log physical blocks corresponding to the logical block are erased. Thus, if the global random physical block does not contain any data belonging to a logical page of the logical block, besides a new data physical block for the logical block, other physical blocks in the rewritable non-volatile memory module 106 do not contain any data belonging to the logical page after the data merging procedure is executed. Accordingly, the mark count value of the logical page can be reset without affecting the identification of old and new data.

As described above, in a memory storage apparatus and a memory controller thereof provided by exemplary embodiments of the disclosure, the data can be identified according to the logical address information and the mark count values in the physical pages when a power failure occurs and the memory storage apparatus is re-started, so that data loss is prevented.

Figure 12:
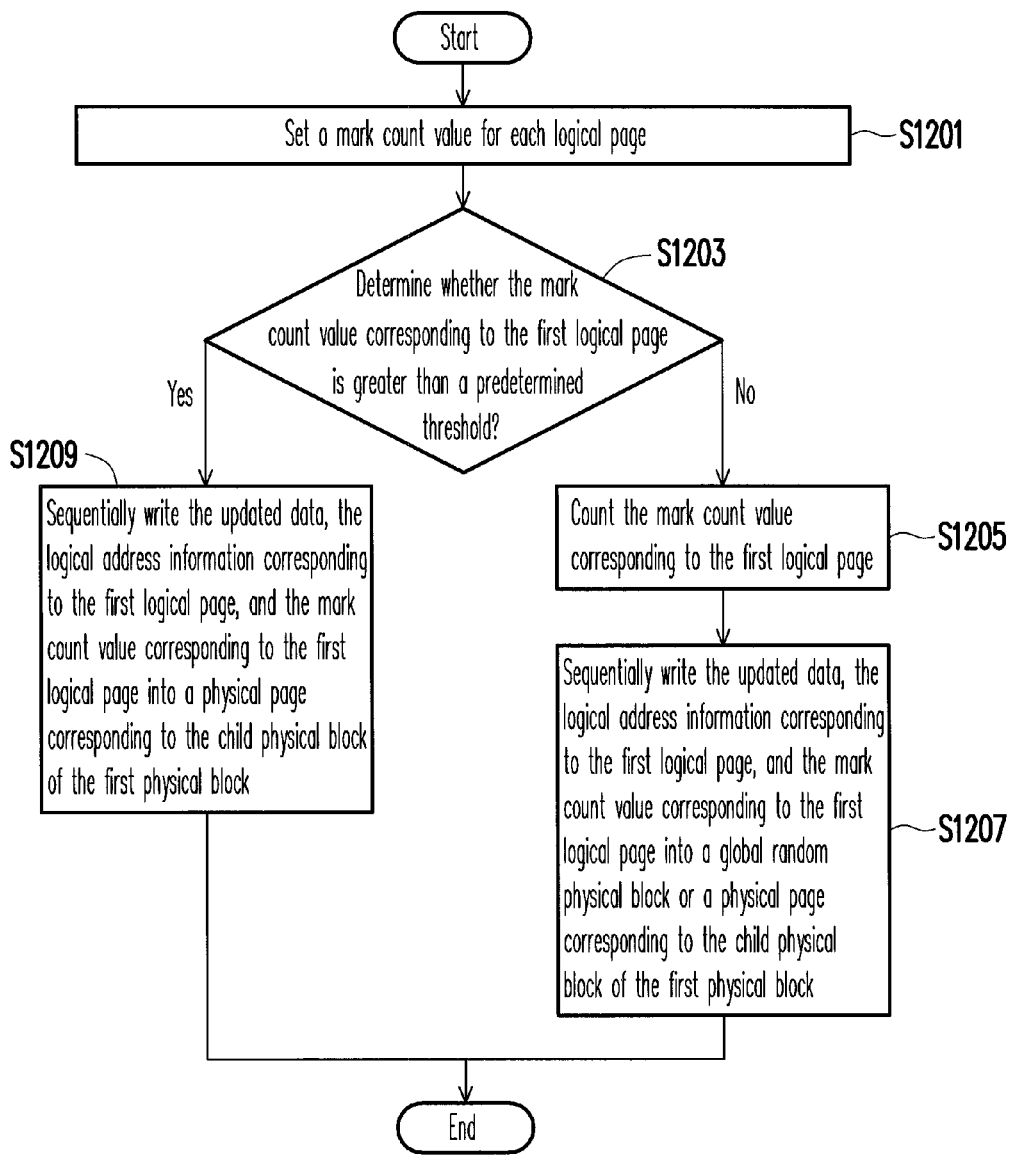
FIG. 12 is a flowchart of writing data from a host system according to an exemplary embodiment of the disclosure.

FIG. 12 is a flowchart of writing data from a host system according to an exemplary embodiment of the disclosure. For the convenience of description, herein it is assumed that updated data to be written belongs to a first logical page of a first logical block and the first logical block is originally mapped to a first physical block in the data area 502.

Referring to FIG. 12, in step S1201, the memory management circuit 202 sets a mark count value for each logical page. Then, in step S1203, the memory management circuit 202 determines whether the mark count value corresponding to the first logical page is greater than a predetermined threshold.

If the mark count value corresponding to the first logical page is not greater than the predetermined threshold, in step S1205, the memory management circuit 202 counts the mark count value corresponding to the first logical page. Next, in step S1207, the memory management circuit 202 sequentially writes the updated data, the logical address information corresponding to the first logical page, and the mark count value corresponding to the first logical page into a global random physical block or a physical page corresponding to the child physical block of the first physical block. To be specific, in step S1207, the memory management circuit 202 decides to use the global random physical block or the child physical block to write the data according to the characteristic of the data.

If the mark count value corresponding to the first logical page is greater than the predetermined threshold, in step S1209, the memory management circuit 202 sequentially writes the updated data, the logical address information corresponding to the first logical page, and the mark count value corresponding to the first logical page into a physical page corresponding to the child physical block of the first physical block.

Figure 13:
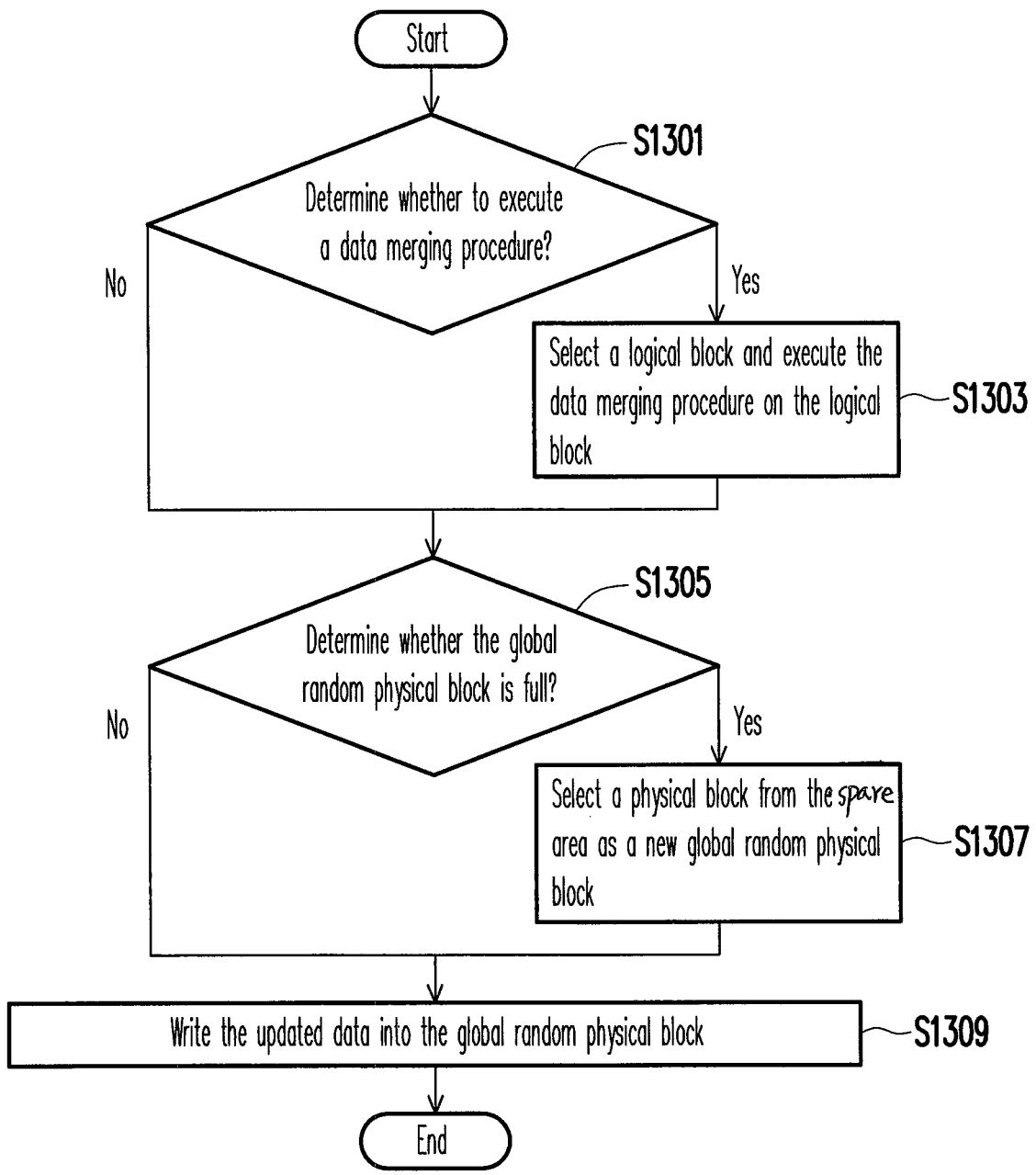
FIG. 13 is a flowchart of writing data by using a global random physical block according to an exemplary embodiment of the disclosure.

FIG. 13 is a flowchart of writing data by using a global random physical block according to an exemplary embodiment of the invention.

Referring to FIG. 13, in step S1301, the memory management circuit 202 determines whether to execute the data merging procedure.

If the data merging procedure is to be executed, in step S1303, the memory management circuit 202 selects a logical block and executes the data merging procedure on the logical block.

After that, in step S1305, the memory management circuit 202 determines whether the global random physical block is full.

If the global random physical block is already full, in step S1307, the memory management circuit 202 selects a physical block from the spare area 504 as a new global random physical block.

In the last step S1309, the memory management circuit 202 writes the updated data into the global random physical block.

Figure 14:
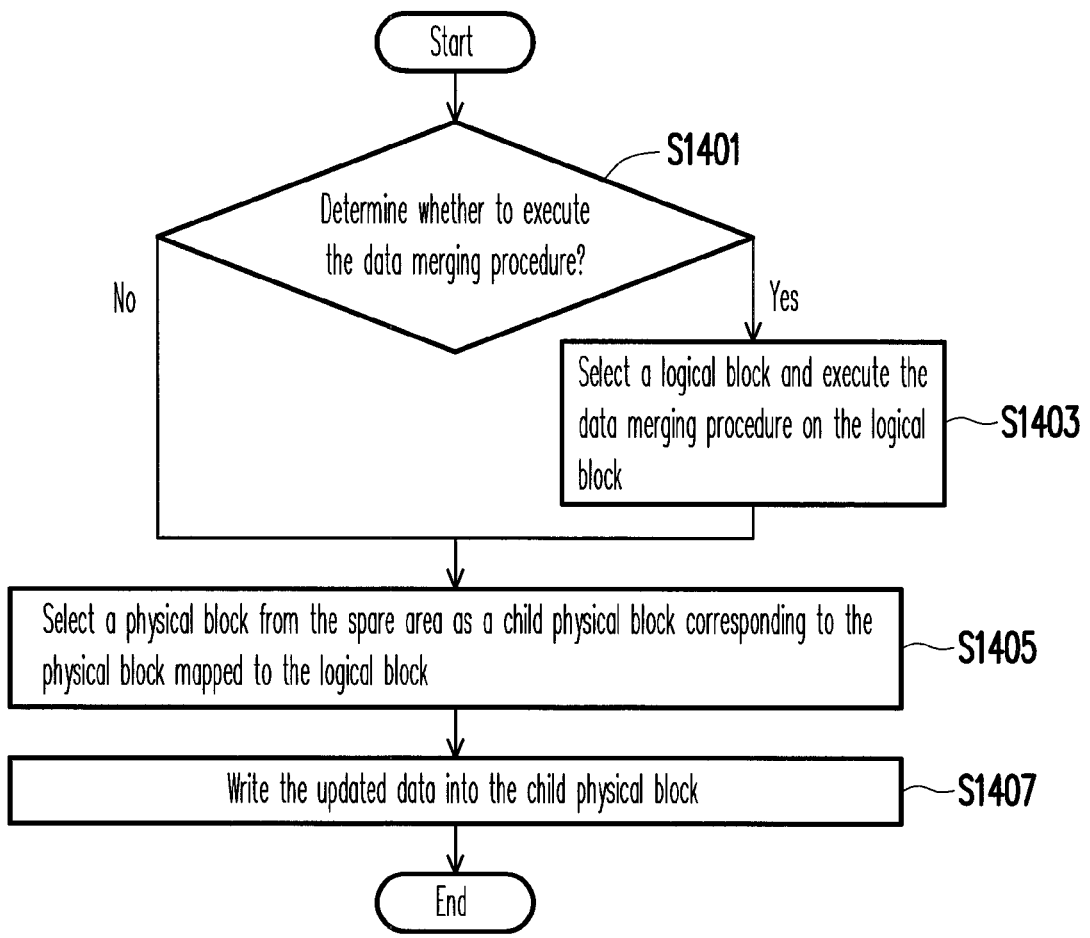
FIG. 14 is a flowchart of writing data by using a child physical block according to an exemplary embodiment of the disclosure.

FIG. 14 is a flowchart of writing data by using a child physical block according to an exemplary embodiment of the invention.

Referring to FIG. 14, in step S1401, the memory management circuit 202 determines whether to execute the data merging procedure.

If the data merging procedure is to be executed, in step S1403, the memory management circuit 202 selects a logical block and executes the data merging procedure on the logical block.

Next, in step S1405, the memory management circuit 202 selects a physical block from the spare area 504 as a child physical block corresponding to the physical block mapped to the logical block. In the last step S1407, the memory management circuit 202 writes the updated data into the child physical block.

Figure 15:
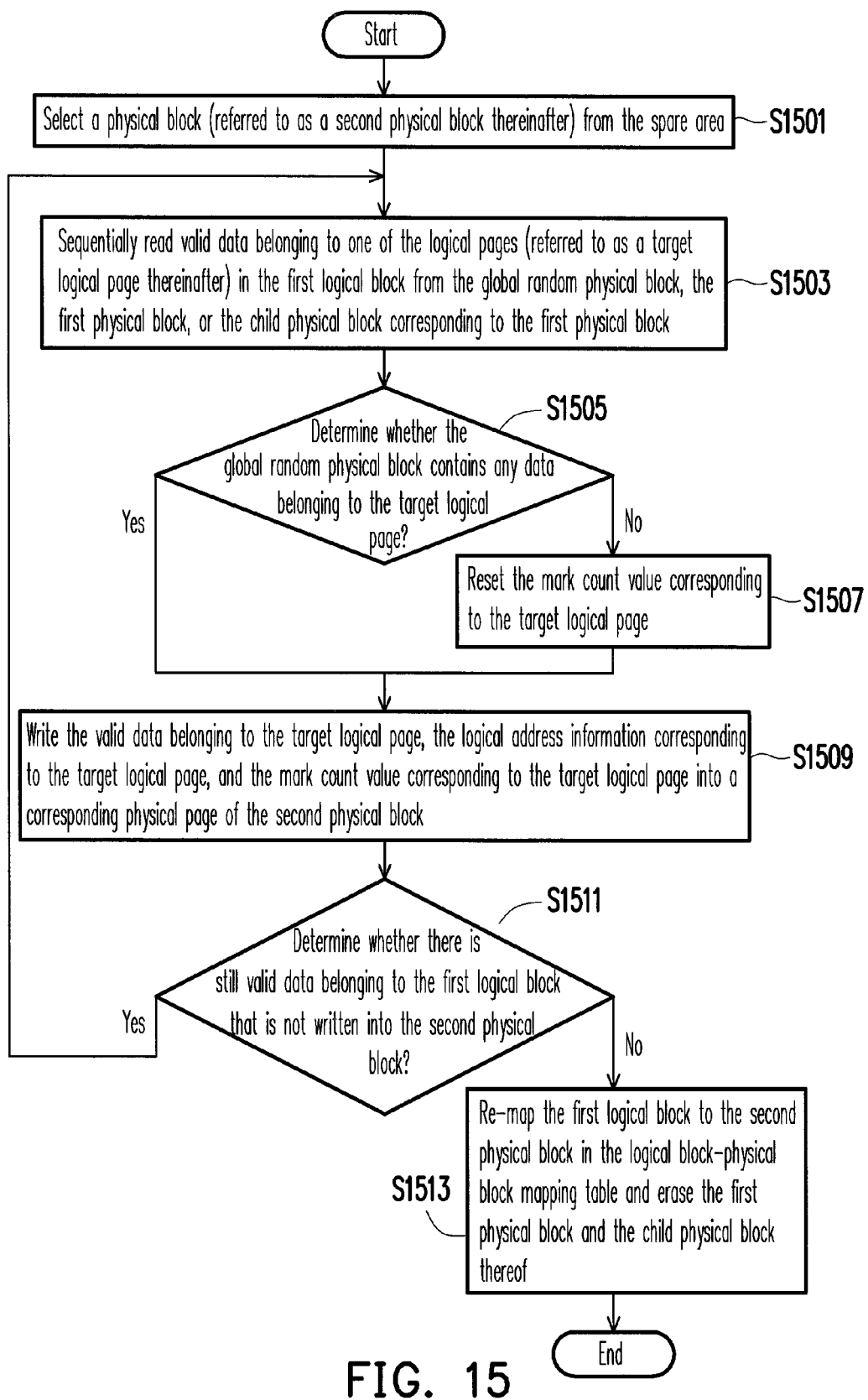
FIG. 15 is a flowchart of executing a data merging procedure according to an exemplary embodiment of the disclosure.

FIG. 15 is a flowchart of executing a data merging procedure according to an exemplary embodiment of the invention. For the convenience of description, herein it is assumed that the data merging procedure is to be executed on the first logical block and the first logical block is originally mapped to a first physical block in the data area 502.

Referring to FIG. 15, in step S1501, the memory management circuit 202 selects a physical block (referred to as a second physical block thereinafter) from the spare area 504.

In step S1503, the memory management circuit 202 sequentially reads valid data (i.e., the latest data) belonging to one of the logical pages (referred to as a target logical page thereinafter) in the first logical block from the global random physical block, the first physical block, or the child physical block corresponding to the first physical block. Besides, in step S1505, the memory management circuit 202 determines whether the global random physical block stores any data belonging to the target logical page.

If the global random physical block does not contain any data belonging to the target logical page, in step S1507, the memory management circuit 202 resets the mark count value corresponding to the target logical page.

Next, in step S1509, the memory management circuit 202 writes the valid data belonging to the target logical page, the logical address information corresponding to the target logical page, and the mark count value corresponding to the target logical page into a corresponding physical page of the second physical block.

After that, in step S1511, the memory management circuit 202 determines whether there is still valid data belonging to the first logical block that is not written into the second physical block.

If there is still valid data belonging to the first logical block that is not written into the second physical block, step S1503 is executed.

If all the valid data belonging to the first logical block has been written into the second physical block, in step S1513, the memory management circuit 202 re-maps the first logical block to the second physical block in the logical block-physical block mapping table and erases the first physical block and the child physical block thereof.

In summary, in the data writing method provided by an exemplary embodiment of the invention, a corresponding mark count value is set for each logical page, and while writing data into a physical page, the logical address information and the mark count value of the corresponding logical page are also written into the physical page. Thereby, when a power failure occurs to the memory storage apparatus, data belonging to the same logical page can be effectively identified from different physical pages, so that data loss can be avoided. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method, for writing updated data into a rewritable non-volatile memory module, wherein the rewritable non-volatile memory module has a plurality of physical blocks, each of the physical blocks has a plurality of physical pages, the physical blocks are logically grouped into at least a data area and a spare area, a plurality of logical blocks is configured and mapped to the physical blocks of the data area, each of the logical blocks has a plurality of logical pages, the updated data belongs to a first logical page of a first logical block among the logical blocks, and the first logical block is mapped to a first physical block among the physical blocks of the data area, the data writing method comprising:
   setting a plurality of mark count values for the logical pages, wherein each of the logical pages is corresponding to one of the mark count values;
   selecting at least one of the physical blocks in the spare area as a first storage area;
   selecting at least another one of the physical blocks in the spare area as a second storage area;
   determining whether the mark count value corresponding to the first logical page is greater than a predetermined threshold;
   when the mark count value corresponding to the first logical page is not greater than the predetermined threshold, changing the mark count value corresponding to the first logical page and writing the updated data and the mark count value corresponding to the first logical page into the first storage area or the second storage area; and
   when the mark count value corresponding to the first logical page is greater than the predetermined threshold, writing the updated data and the mark count value corresponding to the first logical page into the second storage area.

2. A data writing method, for writing updated data into a rewritable non-volatile memory module, wherein the rewritable non-volatile memory module has a plurality of physical blocks, each of the physical blocks has a plurality of physical pages, the physical blocks are logically grouped into at least a data area and a spare area, a plurality of logical blocks is configured and mapped to the physical blocks in the data area, each of the logical blocks has a plurality of logical pages, the updated data belongs to a first logical page of a first logical block among the logical blocks, and the first logical block is mapped to a first physical block among the physical blocks in the data area, the data writing method comprising:

setting a plurality of mark count values for the logical pages, wherein each of the logical pages is corresponding to one of the mark count values;

selecting one of the physical blocks in the spare area as a global random physical block;

selecting another one of the physical blocks in the spare area as a child physical block corresponding to the first physical block;

determining whether the mark count value corresponding to the first logical page is greater than a predetermined threshold;

when the mark count value corresponding to the first logical page is not greater than the predetermined threshold, changing the mark count value corresponding to the first logical page and writing the updated data and the mark count value corresponding to the first logical page into the global random physical block or the child physical block corresponding to the first physical block; and when the mark count value corresponding to the first logical page is greater than the predetermined threshold, writing the updated data and the mark count value corresponding to the first logical page into the child physical block corresponding to the first physical block.

3. The data writing method according to claim 2, wherein the step of writing the updated data and the mark count value corresponding to the first logical page into the global random physical block or the child physical block corresponding to the first physical block comprises:

writing the updated data into a data bit area of a first physical page in the global random physical block or the child physical block corresponding to the first physical block; and writing the mark count value corresponding to the first logical page into a redundancy bit area of the first physical page.

4. The data writing method according to claim 2 further comprising:

selecting a second physical block among the physical blocks of the spare area;

reading valid data belonging to a target logical page among the logical pages of the first logical block from the global random physical block, the first physical block, or the child physical block corresponding to the first physical block;

determining whether the global random physical block stores data belonging to the target logical page; and when the global random physical block does not store the data belonging to the target logical page, resetting the mark count value corresponding to the target logical page; and writing the valid data, a logical address information corresponding to the target logical page, and the mark count value corresponding to the target logical page into the second physical block.

5. The data writing method according to claim 3 further comprising:

writing a logical address information corresponding to the first logical page into the redundancy bit area of the first physical page.

6. A data writing method, for writing updated data into a rewritable non-volatile memory module, wherein the rewritable non-volatile memory module has a plurality of physical blocks, each of the physical blocks has a plurality of physical pages, the physical blocks are logically grouped into at least a data area and a spare area, a plurality of logical blocks is configured and mapped to the physical blocks of the data area, each of the logical blocks has a plurality of logical pages, the updated data belongs to a first logical page of a first logical block among the logical blocks, and the first logical block is mapped to a first physical block among the physical blocks of the data area, the data writing method comprising:

setting a plurality of mark count values for the logical pages, wherein each of the logical pages is corresponding to one of the mark count values;

selecting one of the physical blocks in the spare area as a global random physical block;

selecting another one of the physical blocks in the spare area as a child physical block corresponding to the first physical block;

determining whether the mark count value corresponding to the first logical page is greater than a predetermined threshold;

when the mark count value corresponding to the first logical page is not greater than the predetermined threshold, increasing the mark count value corresponding to the first logical page and writing the updated data and the mark count value corresponding to the first logical page into the global random physical block or the child physical block corresponding to the first physical block; and when the mark count value corresponding to the first logical page is greater than the predetermined threshold, writing the updated data and the mark count value corresponding to the first logical page into the global random physical block.

7. A memory controller, for controlling a rewritable non-volatile memory module, wherein the rewritable non-volatile memory module has a plurality of physical blocks, and each of the physical blocks has a plurality of sequentially arranged physical pages, the memory controller comprising:

a host interface, configured to couple to a host system;

a memory interface, configured to couple to the rewritable non-volatile memory module; and a memory management circuit, coupled to the memory interface, and configured to logically group the physical blocks into at least a data area and a spare area, wherein the memory management circuit configures a plurality of logical blocks to be mapped to the physical blocks of the data area, and each of the logical blocks has a plurality of logical pages, wherein the memory management circuit sets a plurality of mark count values for the logical pages, and each of the logical pages is corresponding to one of the mark count value, wherein the memory management circuit selects one of the physical blocks in the spare area as a global random physical block, wherein the memory management circuit receives updated data from the host system, the updated data belongs to a first logical page of a first logical block among the logical blocks, and the first logical block is mapped to a first physical block among the physical blocks in the data area, wherein the memory management circuit selects another one of the physical blocks in the spare area as a child physical block corresponding to the first physical block, wherein the memory management circuit determines whether the mark count value corresponding to the first logical page is greater than a predetermined threshold, wherein when the mark count value corresponding to the first logical page is not greater than the predetermined threshold, the memory management circuit changes the mark count value corresponding to the first logical page and writes the updated data and the mark count value corresponding to the first logical page into the global random physical block or the child physical block corresponding to the first physical block; and wherein when the mark count value corresponding to the first logical page is greater than the predetermined threshold, the memory management circuit writes the updated data and the mark count value corresponding to the first logical page into the child physical block corresponding to the first physical block.

8. The memory controller according to claim 7, wherein the memory management circuit writes the updated data into a data bit area of a first physical page in the global random physical block or the child physical block corresponding to the first physical block and writes the mark count value corresponding to the first logical page into a redundancy bit area of the first physical page.

9. The memory controller according to claim 7,
wherein the memory management circuit selects a second physical block among the physical blocks of the spare area,
wherein the memory management circuit reads valid data belonging to a target logical page among the logical pages of the first logical block from the global random physical block, the first physical block, or the child physical block corresponding to the first physical block,
wherein the memory management circuit determines whether the global random physical block stores data belonging to the target logical page,
wherein when the global random physical block does not store the data belonging to the target logical page, the memory management circuit resets the mark count value corresponding to the target logical page,
wherein the memory management circuit writes the valid data, a logical address information corresponding to the target logical page, and the mark count value corresponding to the target logical page into the second physical block.

10. The memory controller according to claim 8, wherein the memory management circuit writes a logical address information corresponding to the first logical page into the redundancy bit area of the first physical page.

11. A memory controller, for controlling a rewritable non-volatile memory module, wherein the rewritable non-volatile memory module has a plurality of physical blocks, and each of the physical blocks has a plurality of sequentially arranged physical pages, the memory controller comprising:
a host interface, configured to couple to a host system;
a memory interface, configured to couple to the rewritable non-volatile memory module; and
a memory management circuit, coupled to the memory interface, and configured to logically group the physical blocks into at least a data area and a spare area,
wherein the memory management circuit configures a plurality of logical blocks to be mapped to the physical blocks in the data area, and each of the logical blocks has a plurality of logical pages,
wherein the memory management circuit sets a plurality of mark count values for the logical pages, and each of the logical pages is corresponding to one of the mark count values,
wherein the memory management circuit selects one of the physical blocks in the spare area as a global random physical block, wherein the memory management circuit receives updated data from the host system, the updated data belongs to a first logical page of a first logical block among the logical blocks, and the first logical block is mapped to a first physical block among the physical blocks in the data area, wherein the memory management circuit selects another one of the physical blocks in the spare area as a child physical block corresponding to the first physical block,
wherein the memory management circuit determines whether the mark count value corresponding to the first logical page is greater than a predetermined threshold,
wherein when the mark count value corresponding to the first logical page is not greater than the predetermined threshold, the memory management circuit changes the mark count value corresponding to the first logical page and writes the updated data and the mark count value corresponding to the first logical page into the global random physical block or the child physical block corresponding to the first physical block; and
wherein when the mark count value corresponding to the first logical page is greater than the predetermined threshold, the memory management circuit writes the updated data and the mark count value corresponding to the first logical page into the global random physical block.

12. A memory storage apparatus, comprising:
a connector, configured to couple to a host system;
a rewritable non-volatile memory module, having a plurality of physical blocks, wherein each of the physical blocks has a plurality of sequentially arranged physical pages; and
a memory controller, coupled to the connector and the rewritable non-volatile memory module, and configured to logically group the physical blocks into at least a data area and a spare area,
wherein the memory controller configures a plurality of logical blocks to be mapped to the physical blocks in the data area, and each of the logical blocks has a plurality of logical pages,
wherein the memory controller sets a plurality of mark count values for the logical pages, and each of the logical pages is corresponding to one of the mark count values,
wherein the memory controller selects at least one of the physical blocks in the spare area as a global random physical block,
wherein the memory controller receives updated data from the host system, the updated data belongs to a first logical page of a first logical block among the logical blocks, and the first logical block is mapped to a first physical block among the physical blocks in the data area,
wherein the memory controller selects another one of the physical blocks in the spare area as a child physical block corresponding to the first physical block,
wherein the memory controller determines whether the mark count value corresponding to the first logical page is greater than a predetermined threshold,
wherein when the mark count value corresponding to the first logical page is not greater than the predetermined threshold, the memory controller changes the mark count value corresponding to the first logical page and writes the updated data and the mark count value corresponding to the first logical page into the global random physical block or the child physical block corresponding to the first physical block; and
wherein when the mark count value corresponding to the first logical page is greater than the predetermined threshold, the memory controller writes the updated data and the mark count value corresponding to the first logical page into the child physical block corresponding to the first physical block.

13. The memory storage apparatus according to claim 12, wherein the memory controller writes the updated data into a data bit area of a first physical page in the global random physical block or the child physical block corresponding to the first physical block and writes the mark count value corresponding to the first logical page into a redundancy bit area of the first physical page.

14. The memory storage apparatus according to claim 12, wherein the memory controller selects a second physical block among the physical blocks of the spare area,
wherein the memory controller reads valid data belonging to a target logical page among the logical pages of the first logical block from the global random physical block, the first physical block, or the child physical block corresponding to the first physical block,
wherein the memory controller determines whether the global random physical block stores data belonging to the target logical page,
wherein when the global random physical block does not store the data belonging to the target logical page, the memory controller resets the mark count value corresponding to the target logical page,
wherein the memory controller writes the valid data, a logical address information corresponding to the target logical page, and the mark count value corresponding to the target logical page into the second physical block.

15. The memory storage apparatus according to claim 13, wherein the memory controller writes a logical address information corresponding to the first logical page into the redundancy bit area of the first physical page.

16. A memory storage apparatus, comprising:
a connector, configured to couple to a host system;
a rewritable non-volatile memory module, having a plurality of physical blocks, wherein each of the physical blocks has a plurality of sequentially arranged physical pages; and
a memory controller, coupled to the connector and the rewritable non-volatile memory module, and configured to logically group the physical blocks into at least a data area and a spare area,
wherein the memory controller configures a plurality of logical blocks to be mapped to the physical blocks in the data area, and each of the logical blocks has a plurality of logical pages,
wherein the memory controller sets a plurality of mark count values for the logical pages, and each of the logical pages is corresponding to one of the mark count values,
wherein the memory controller selects at least one of the physical blocks in the spare area as a global random physical block,
wherein the memory controller receives updated data from the host system, the updated data belongs to a first logical page of a first logical block among the logical blocks, and the first logical block is mapped to a first physical block among the physical blocks in the data area,
wherein the memory controller selects at least another one of the physical blocks in the spare area as a child physical block corresponding to the first physical block,
wherein the memory controller determines whether the mark count value corresponding to the first logical page is greater than a predetermined threshold,
wherein when the mark count value corresponding to the first logical page is not greater than the predetermined threshold, the memory controller changes the mark count value corresponding to the first logical page and writes the updated data, a logical address information corresponding to the first logical page, and the mark count value corresponding to the first logical page into the global random physical block or the child physical block corresponding to the first physical block; and
wherein when the mark count value corresponding to the first logical page is greater than the predetermined threshold, the memory controller writes the updated data, the logical address information corresponding to the first logical page, and the mark count value corresponding to the first logical page into the global random physical block.

* * * * *